United States Patent [19]

Seyd et al.

[11] 3,919,880

[45] Nov. 18, 1975

[54] METHOD AND APPARATUS FOR TESTING CLOSED-END TUBES IN HEAT EXCHANGERS OF NUCLEAR REACTORS AND THE LIKE

[75] Inventors: Günter Seyd, Erlangen; Axel Bergbauer, Rosenbach; Uwe Paulsen, Erlangen, all of Germany

[73] Assignee: Siemens Aktiengesellschaft, Munich, Germany

[22] Filed: June 9, 1972

[21] Appl. No.: 261,247

[30] Foreign Application Priority Data

June 9, 1971 Germany............................ 2128604

[52] U.S. Cl. .................... 73/49.8; 73/49.5; 138/90
[51] Int. Cl. ............................................. G01m 3/28
[58] Field of Search ............ 73/49.8, 49.6, 49.5, 40; 138/90, 93

[56] References Cited
UNITED STATES PATENTS

| | | | |
|---|---|---|---|
| 2,416,441 | 2/1947 | Grant et al....................... | 73/49.5 X |
| 2,526,172 | 10/1950 | Sunde ............................. | 73/49.5 X |
| 3,726,319 | 4/1973 | Patterson ........................ | 73/49.8 X |

*Primary Examiner*—Jerry W. Myracle
*Assistant Examiner*—Joseph W. Roskos
*Attorney, Agent, or Firm*—Kenyon & Kenyon Reilly Carr & Chapin

[57] ABSTRACT

A test stopper is insertable into a tube closed at one end for testing the tightness of the tube with a fluid under pressure, the tube being in a heat exchanger of a nuclear reactor or the like. The test stopper includes a tubular outer jacket that is expandable outwardly to tightly seat the stopper in the tube. The stopper also has front and back end-face members joined to the ends of the outer jacket to define a closed space within the jacket. With the stopper inserted into the tube, the front end-face member and the closed end portion of the tube define a closed inner region of the tube. An inner tubular member disposed within the outer jacket partitions the closed space within the jacket into an annular outer chamber and a cylindrical inner chamber. A pressure-fluid supply selectively supplies fluid to the chambers. The outer jacket expands in response to fluid admitted to the annular chamber and the front end-face member has a through bore to admit fluid under pressure to the inner region of the tube.

A method of testing of such a tube with a fluid under pressure includes inserting the test stopper into the tube and then expanding the outer jacket of the stopper to seat the stopper firmly in the tube. A fluid under pressure is directed through the stopper and into the closed region defined by the front end-face member of the stopper and the closed end portion of the tube. The pressure of the fluid introduced into this closed region is monitored for detecting a leak in the closed-end tube.

9 Claims, 1 Drawing Figure

U.S. Patent  Nov. 18, 1975  3,919,880
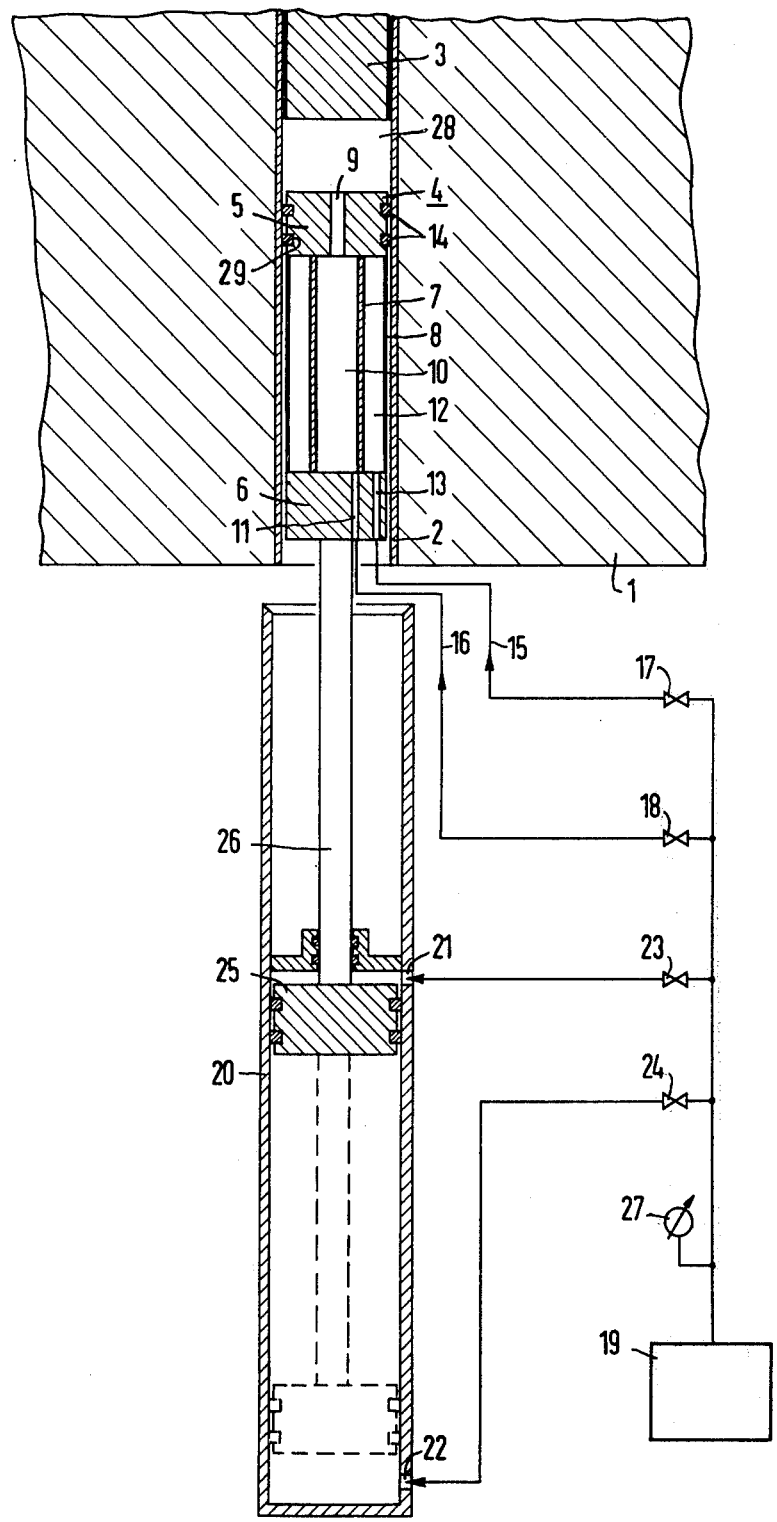

METHOD AND APPARATUS FOR TESTING CLOSED-END TUBES IN HEAT EXCHANGERS OF NUCLEAR REACTORS AND THE LIKE

BACKGROUND OF THE INVENTION

The invention relates to a method and apparatus for testing the tightness of closed-end tubes in heat exchangers of nuclear reactors and the like. More particularly, the invention relates to a method and apparatus for testing such tubes for tightness with a fluid under pressure.

Tubes in heat exchangers can develop leaks. Such a condition can assume proportions which require the heat exchanger to be shut down and overhauled. Especially critical are such leaks in heat exchangers which are part of nuclear power plants. Since here, radioactive particles from the primary circulation system can reach the secondary circulation system.

In such cases, it is preferable that the faulty tube be rendered inoperative by closing both ends of the tube in the tube plate of the heat exchanger so as to be watertight. The tubes can be closed, for example, by welding or by means of an explosion-closure stopper. The latter being a metal stopper which is welded to the tube according to the explosion-welding process. With this process, the repair time is shortened when compared to hand-welding procedures, so that in nuclear power plants the danger to maintenance personnel from possible radioactive radiation is considerably reduced. After closing the tube ends, it is necessary that the closures be tested for tightness.

SUMMARY OF THE INVENTION

It is an object of the invention to provide a method of testing the tightness of closed-end tubes with a fluid under pressure.

It is another object of the invention to provide a test stopper insertable into the tube for carrying out the method of the invention.

It is still another object of the invention to provide an apparatus incorporating the test stopper for testing the tightness of the tube.

As a feature of the invention, the test stopper includes a thin-walled tubular outer jacket that is expandable outwardly. The stopper further has front and back end-face members joined to the ends of the outer jacket to define a closed space within the jacket. With the stopper inserted into the tube, the front end-face member and the closed end portion of the tube conjointly define a closed test region of the tube. An inner tubular member disposed within the outer jacket partitions the closed space within the jacket into an annular outer chamber and a cylindrical inner chamber. Pressure supply means is provided for selectively supplying fluid to the chambers. When fluid is supplied to the annular chamber the jacket expands outwardly in response to the pressure exerted by the fluid and firmly seats the stopper against the inner wall of the tube to be tested. The front end-face member of the stopper has a bore extending therethrough and communicating with the cylindrical inner chamber to admit fluid under pressure to the test region of the tube.

According to a feature of a method of the invention, the test stopper is inserted into the tube to be tested and the outer jacket of the stopper is expanded to seat the stopper firmly in the tube. Fluid under pressure is then directed through the stopper and introduced into the closed region or test space defined by the front end-face member of the stopper and the closed end portion of the tube. The pressure of the fluid introduced into this closed region is monitored for detecting the pressure of a leak in the closed-end tube.

It is especially advantageous if the outer jacket of the stopper constitutes a thin-walled tube. As indicated above, the inner space of the stopper is partitioned into two chambers by an additional tube; this tube is subjectable to pressure and suction. The chambers are sealed by the end-face walls and are connectable to pressure-fluid conduits via the back end-face wall and the inner chamber additionally communicates with a bore extending through the front end-face wall. The front end-face wall of the stopper is provided with sealing rings which are fitted to the diameter of the tube to be tested. Preferably, insertion means are connectable to the back end-face wall of the stopper.

Although the invention is illustrated and described herein as a method and apparatus for testing closed-end tubes in heat exchangers of nuclear reactors and the like, it is nevertheless not intended to be limited to the details shown, since various modifications may be made therein within the scope and the range of the claims. The invention, however, together with additional objects and advantages will be best understood from the following description and in connection with the accompanying drawing.

DESCRIPTION OF THE DRAWING

The drawing illustrates a closed-end tube to be tested for tightness with a test stopper of the invention, the test stopper being shown in position for testing. Also shown are the pressure-fluid pump, connecting conduits and valves as well as the insertion device which together with the test stopper constitute the testing apparatus of the invention for performing the method of the invention.

DESCRIPTION OF THE PREFERRED EMBODIMENTS

Referring to the drawing, a heat exchanger tube 2 is disposed in the tube plate 1 of a heat exchanger. The tube 2 is closed in the region of the tube plate by a stopper 3 which can, for example, be an explosive-closure stopper. A test stopper 4 is guided into the open end of the tube 2. The test stopper 4 according to the invention comprises front and back end-face members in the form of respective plates 5 and 6 and a central tubular member 7 subjectable to forces developed by pressure and suction as well as a thin-walled tubular jacket 8 which is fitted to the diameter of the end plates. The jacket 8, for example, can be made of metal or synthetic material.

A central bore 9 is provided in the end plate 5 and communicates via the inner space 10 of the tubular member 7 with a bore 11 in the end plate 6. A further bore 13 is provided in end plate 6 and communicates with the intermediate space 12 located between central tubular member 7 and the outer jacket 8. Grooves 29 are at the periphery of the end plate 5 and accommodate sealing rings 14. Bore means in the form of bores 11 and 13 are a pressure-fluid supply means that can further comprise, according to the apparatus of the invention, supply conduits 15 and 16 for carrying a pressure fluid. Supply conduits 16 and 15 are connectable to bores 11 and 13 respectively. The pressure-fluid supply means can also comprise a pressure pump 19 for moving a pressure medium such as a fluid, the latter being, for example, gas or water, as well as valves 17 and 18 which are in conduits 15 and 16 respectively. The conduits 15 and 16 connect via valves 17 and 18 to pump 19 as shown in the drawing.

An insertion device is coupled to end plate 6, for example, by a threaded connection. The insertion means comprises, for example, a double-action cylinder 20 equipped with a piston 25. The cylinder 20 is connected to pressure pump 19 via connections 21, 22 and valves 23, 24. The piston rod of piston 25 is designated by reference numeral 26.

To test the closure of stopper 3 for tightness according to the method of the invention, the test stopper 4 is guided into the heat exchanger tube 2 in the region of the tube plate 1. Then the valve 17 is first opened so that the thin-walled outer jacket 8 can expand laterally and lie tightly against the inner wall of the tube 2. The intermediate space 12 thus becomes a clamping chamber and, as soon as an adequate pressure is obtained therein, the valve 18 is slowly opened. In this way, the testing pressure is increased in the inner space or test chamber 10 and in the inner region 28 of the tube 2 under test. The inner space 28 constitutes the test space and is defined by the front end-face member 5 of the stopper 4 and the closed end portion of the tube 2 when the stopper 4 is inserted therein. The pressure in the chamber 12 prevents the test stopper from slipping out of the tube 2 under test.

During the time that the pressure is applied, the testing pressure can be monitored with a manometer 27 connected with the conduit carrying the pressure medium; this permits determining if a leak is present in the closure of the tube 2.

After testing, the pressure present for open valves 17 and 18 can, for example, be reduced by turning off the pressure pump 19. In order to remove the test stopper 4 when the valve 17 is closed, a renewed pressure can be applied to the test space 28 via valve 18, so that the test stopper 4 is forced out, under pressure, from the tube 2.

The application of the insertion device enables the test stopper 4 to be brought to and operated at its operational position by remote control. The insertion device, in addition, affords the advantage that the test stopper 4 can be safely removed from a tube not properly sealed.

What is claimed is:

1. An apparatus for testing the tightness of a tube, closed at one end, with a fluid under pressure, the tube being in a heat exchanger of a nuclear reactor or the like, the apparatus comprising a test stopper including a tubular outer jacket, front and back end-face members joined to respective longitudinal ends of said outer jacket to define a closed space bounded by said jacket and said end-face members, said front end-face member and the closed end portion of the tube defining a closed inner region of the tube when the stopper is inserted therein, an inner tubular member disposed within said outer jacket extending between said end-face members to partition said closed space into an annular outer chamber and a cylindrical inner chamber; pressure-fluid supply means connected to said stopper for selectively supplying fluid to said chambers; said inner tubular member being subjectable to forces developed by pressure and suction within said inner chamber, said outer jacket being thin-walled and expandable outwardly in response to fluid admitted under pressure to said annular chamber, thereby firmly seating the stopper against the inner wall of the tube to be tested, said front end-face member having a bore extending therethrough and communicating with said inner chamber to admit fluid under pressure from said inner chamber to the inner region of the tube; and insertion means connected to said back end-face member of said stopper for removably inserting the same into the tube.

2. An apparatus according to claim 1, said stopper comprising sealing rings mounted on said front end-face member, said sealing rings having diameter fitted to the diameter of the tube to be tested.

3. An apparatus according to claim 1, said pressure-fluid supply means comprising pressure indicating means for monitoring the pressure of the fluid admitted to the closed inner region of the tube.

4. An apparatus according to claim 1, said pressure-fluid supply means comprising two bore means formed in said back end-face member and communicating with said chambers respectively, a pump for moving the fluid and building a pressure head therein, and fluid conduit means connecting said pump with said two bore means, said conduit means comprising valve means for selectively controlling the flow of the fluid to said chambers.

5. An apparatus according to claim 4, said pressure-fluid supply means comprising a manometer connected to said fluid conduit means for indicating the pressure of the fluid admitted to the closed inner region of the tube.

6. An apparatus according to claim 5, said insertion means comprising a double-action cylinder, a piston slidably mounted in said cylinder and having a piston rod connected to said back end-face member of said stopper, said pressure-fluid supply means comprising additional conduit means connecting said cylinder to said pump, said additional conduit means including additional valve means for controlling the flow of fluid to said cylinder for moving said piston.

7. A test stopper insertable into a tube closed at one end for testing the tightness of the tube with a fluid under pressure, the tube being in a heat exchanger of a nuclear reactor or the like, the test stopper comprising a tubular outer jacket, front and back end-face members joined to respective longitudinal ends of said outer jacket to define a closed space bounded by said jacket and said end-face members, said front end-face member and the closed end portion of the tube defining a closed inner region of the tube when the test stopper is inserted therein, an inner tubular member disposed within said outer jacket and extending between said end-face members to partition said closed space into an annular outer chamber and a cylindrical inner chamber, and pressure-fluid supply means for selectively supplying fluid to said chambers, said outer jacket being thin-walled and expandable outwardly in response to fluid admitted under pressure to said annular chamber, thereby firmly seating the stopper against the inner wall of the tube to be tested, said front end-face member having a bore extending therethrough and communicating with said inner chamber to admit fluid under pressure from said inner chamber to the inner region of the tube.

8. A test stopper according to claim 7, said pressure-fluid supply means comprising pressure indicating means for monitoring the pressure of the fluid admitted to the closed inner region of the tube.

9. A test stopper according to claim 7, said test stopper comprising sealing rings mounted on said front endface member, said sealing rings having a diameter fitted to the diameter of the tube to be tested.

* * * * *